United States Patent

Briones

[15] 3,670,570

[45] June 20, 1972

[54] LIGHT INTENSITY CALORIMETER
[72] Inventor: Robert A. Briones, Granada Hills, Calif.
[73] Assignee: TRW Inc., Redondo Beach, Calif.
[22] Filed: April 30, 1971
[21] Appl. No.: 139,268

Related U.S. Application Data

[63] Continuation of Ser. No. 592,381, Nov. 7, 1966, abandoned.

[52] U.S. Cl. .......................................................73/190 R
[51] Int. Cl. .....................................G01k 17/00, G01t 1/16
[58] Field of Search....................................73/190; 250/83.3

[56] References Cited

UNITED STATES PATENTS

| 1,089,743 | 3/1914 | Brown | 73/355 |
|---|---|---|---|
| 1,940,759 | 12/1933 | Lincoln | 324/92 |
| 1,980,213 | 11/1934 | Lindsay | 73/355 |
| 2,846,647 | 8/1958 | MacPherson | 324/95 |
| 2,866,950 | 12/1958 | Smits | 324/95 |

OTHER PUBLICATIONS

Wiloughby, A. B. " Absolute Water Flow Calorimeter for the Measurement of Intense Beams of Radiant Energy" In Rev. of Scientific Instruments Vol. 25 No. 7 July 1954 Pg. 667– 669
Damon et al. " A Liquid Calorimeter for High Energy Lasers." In Applied Optics Vol. 2 No. 2 Feb. 1963 pg. 163– 164

Primary Examiner—Richard C. Queisser
Assistant Examiner—Herbert Goldstein
Attorney—Daniel T. Anderson, Gerald Singer and Alfons Valukonis

[57] ABSTRACT

A calorimeter for measuring high-energy pulsed laser light. The light is absorbed by a suitable liquid which causes a molecular expansion. The liquid may be permitted to expand and the change of volume may be measured by a capillary tube. Alternatively, if the liquid is not permitted to expand, the rising pressure may be measured. This obviates the usual waiting period needed for a temperature equilibrium to be reached in conventional calorimeters.

4 Claims, 2 Drawing Figures

Robert A. Briones,
INVENTOR.
BY.
Edward Dugas
AGENT.

LIGHT INTENSITY CALORIMETER

This Application is a Streamlined Continuation of application, Ser. No. 592,381, filed Nov. 7, 1966, now abandoned.

This invention relates in general to energy measuring apparatus and more particularly to apparatus for measuring the amount of light emitted from a high-energy source such as a laser.

With the advent of lasers, there exists a need for diagnostic energy measuring devices which are simple in function, cheap to produce and are easily calibrated.

Existing devices are calibrated at low energies and then are extrapolated to the higher energy levels of a laser.

A prior art device for measuring energy by calorimeter technique is described in U.S. Pat. No. 3,143,703, entitled "Microwave Calorimeter Wattmeter With A Reflectionless R. F. Termination", by L. D. Kraeuter. In the device of that patent, microwave energy is dispersed into a known quantity of water. Because the water is a lossy conductor, rapid dissipation of the microwave energy takes place. The conversion of microwave energy into heat energy raises the temperature of the water. The temperature of the water is then proportional to the microwave energy dissipated.

In the apparatus of this invention, energy from a light source, such as a laser, is dissipated in a volume of light-absorbing liquid, causing a change in the temperature, which in turn causes a change in the volume or the pressure of the liquid. In one embodiment a capillary column provides a path for the expanded liquid. The distance that the liquid rises in the capillary column is proportional to the light energy absorbed by the liquid. In another embodiment the volume is held substantially constant, causing the pressure to vary as a function of the absorbed light energy.

It is therefore an object of the present invention to provide a novel apparatus for measuring the energy of a light source and, in particular, a high energy pulsed laser light source such as a ruby laser or a neodymium doped glass laser.

It is another object of the present invention to provide an improved high energy measuring apparatus utilizing the thermal expansion qualities of a liquid.

It is another object of the present invention to provide an apparatus for measuring relatively high levels of light energies which also may be calibrated at these high energy levels.

These and other objects of the present invention will become more apparent when taken in conjunction with the following description and drawings wherein.

Figure 1:
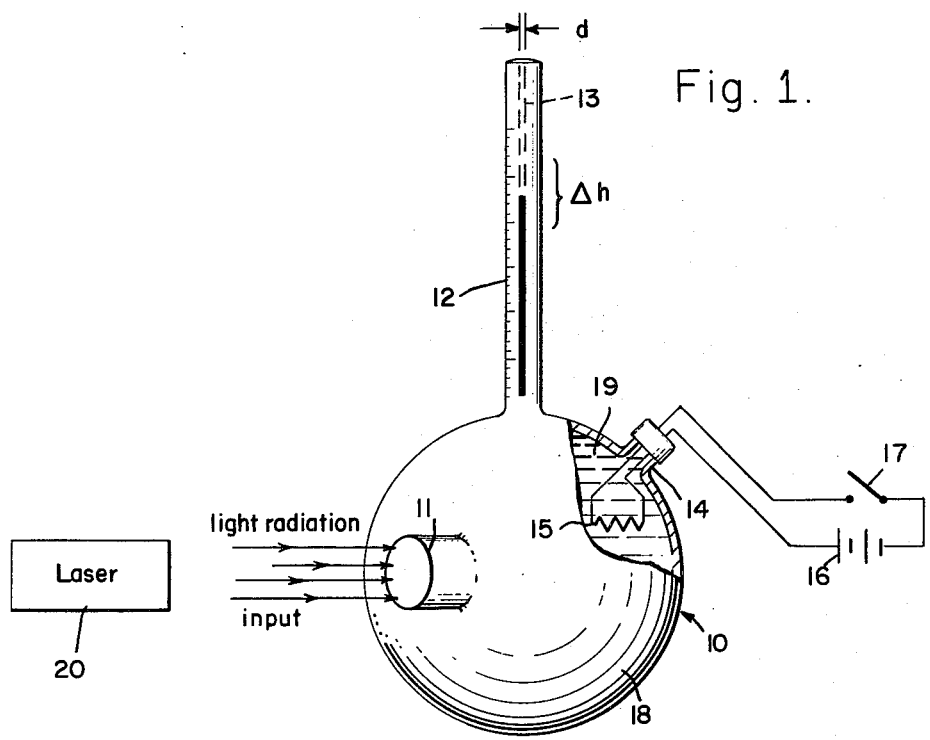
FIG. 1 illustrates a first embodiment of the invention.

Referring to FIG. 1, the apparatus 10 is shown comprised of a hollow spheroid body vessel 18 having a hollow etched capillary member 12 projection therefrom. The opening in the capillary tube has a diameter $d$. An opening 14 is provided in the body member for the insertion of a predetermined amount of light absorbing fluid 19. This opening is then sealed by standard means well known to those persons skilled in the art. A heating element 15, such as a resistor, is inserted into the liquid 19 and is electrically connected in circuit through the switch 17 to a power supply 16. The power supply may consist of a charged condenser which will deliver a known pulse of energy to the heating element. The heat generated by element 15 is used to calibrate the expansion of liquid 15. To calibrate the device, switch 17 is closed imparting a known amount of energy into the liquid 19. The expansion of the liquid will be proportional to the known amount of energy introduced. A window 11 projects from the spherical body member 18 to provide a flat homogenous surface 11 through which the radiation from the laser light source 20 may impinge on and pass into the liquid 19. The outside of the sphere, except for the flat surface 11, may be aluminized or silvered to minimize any radiation loss, and to reflect the radiation back into the vessel.

The apparatus operates on the principle of thermal expansion of liquids, namely, $$V_f = V_i(1 + \alpha \Delta T + \beta \Delta T^2 + \gamma \Delta T^3) \quad (1)$$

where $V_i$ is the initial volume of fluid, $\Delta T$ is the change in temperature and $\alpha$, $\beta$, and $\gamma$ are the three volumetric expansion coefficients.

For small changes in temperature, one is justified in using the linear approximation of the above:

$$\Delta V \cong V_i \alpha \Delta T \quad (2)$$

The change in temperature is determined by the specific heat "$c_p$", mass of the absorbing liquid "$\rho V_i$" and the amount of heat absorbed "$Q$":

$$\Delta T = (\Delta Q / \rho V_i c_p) \quad (3)$$

Substitution of Eq. (3) in (2) shows: $\Delta V = (\Delta Q \alpha / \rho c_p) \quad (4)$ From these equations, it can be seen that the change in volume is independent of the volume of liquid employed. Therefore, I propose that a sphere, or any other shape filled with a light absorbing liquid, can be used to measure the amount of energy emitted by a source such as a laser or flash lamp. Since the absorption of the energy is local, the change in volume is instantaneous; thus, no thermal gradient or time constant is present to introduce error in peak readings due to heat loss. One only needs to insure that all of the energy is absorbed. This may require doping the liquid with an appropriate dye.

At present, there exist several commercial laser calorimeters which are based upon the measurement of the temperature change of a liquid via thermal electric elements imbedded in the fluid column. (Laser Fare, Vol. 1, No. 1, published by Korad Corporation, Jan. 1965.) These systems require detailed knowledge of the heat capacities of the various component parts. Accurate measurement requires involved analysis of heat losses and thermal time constants. In brief, calibration is indeed indirect and difficult. The output of these systems cannot be read without the aid of a potentiometer or microvoltmeter.

The apparatus of this invention completely eliminates calibration difficulties, requires no external electronics or measuring circuits outside of an engraved scale. This type of light intensity calorimeter is not dependent upon thermal equalization or upon thermal gradients. For the embodiment shown in the drawing $$Q = \frac{\pi d^2}{4} (\rho c_p / \alpha) \Delta h \quad (5)$$

A list of liquids which may be used on the light absorbing liquid 19 is given in the following chart:

| Compound | $x\alpha10^{-3}$ | Sp. the $c_p$ | Density $\rho$ | $\alpha$ $c_p \rho$ |
|---|---|---|---|---|
| Pentane | 1.60 | 0.527 | 0.624 | $4.87 \times 10^{-3}$ |
| Ether | 1.65 | 0.547 | 0.713 | $4.23 \times 10^{-3}$ |
| Carbon tetrachloride | 1.23 | 0.201 | 1.59 | $3.84 \times 10^{-3}$ |
| Chloroform | 1.27 | 0.234 | 1.49 | $3.64 \times 10^{-3}$ |
| Acetone | 1.48 | 0.528 | 0.79 | $3.55 \times 10^{-3}$ |
| Benzene | 1.23 | 0.406 | 0.879 | $3.46 \times 10^{-3}$ |
| Alcohols | 1.19 | 0.600 | 0.794 | $2.50 \times 10^{-3}$ |
| Phenols | 1.09 | 0.561 | 1.072 | $1.82 \times 10^{-3}$ |

From the above chart, it can be seen that there is a large range of liquids that can be used, depending upon the energy level to be measured and the available size capillary. Since these particular liquids are transparent, an appropriate dye can be used, such as an analine dye, to make the absorption of the input energy efficient.

In conclusion, the important feature of this invention is that it does not matter how the optical energy is distributed in the sphere. The change in volume produced is independent of the distribution of the heat in the sphere and depends only on the total heat absorbed by the liquid. It is, therefore, unnecessary to wait to take measures to insure a uniform temperature distribution as in the case of a thermocouple type calorimeter.

Figure 2:
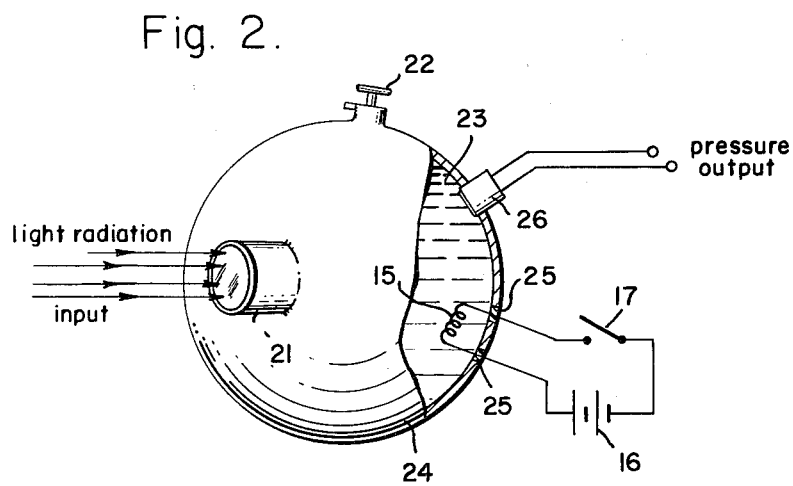
FIG. 2 illustrates a second embodiment of the invention.

Referring to FIG. 2, the apparatus 10 is shown comprised of a hollow spheroid body vessel 24. The vessel 24 is made of a material which will not flex any substantial degree under the influence of pressure.

A window 21 which is transparent to light is inserted through the wall of the vessel to provide a passageway for light radiation. A light absorbing liquid 23 fills the vessel. A pressure transducer 26 projects through the wall of vessel 24 to measure the pressure exerted by the liquid against the wall of the vessel. A heating element 15 is immersed in the liquid 23. Power supply 16 is connected to the heating element by means of switch 17. The leads from the heating element to the switch and power supply are insulated from the walls of the vessel by means of insulators 25. The heating element provides a known amount of thermal energy to the liquid so that the instrument may be calibrated. A relief valve 22 is inserted through the wall of the vessel to re-zero any undesired pressure buildup.

While there has been shown what are considered to be the preferred embodiments of the invention, it will be manifest that many changes and modifications may be made therein without departing from the essential spirit of the invention. It is intended, therefore, in the annexed claims to cover all such changes and modifications as fall within the true spirit of the invention.

WHAT IS CLAIMED IS:

1. A radiant energy calorimeter comprising:
   a. a closed container containing a radiant energy absorbing liquid having a substantial molecular expansion upon absorption of heat due to radiant energy;
   b. a source of radiant energy impinging on the liquid in said container for imparting pulsed radiant energy thereto, thereby to increase the pressure of the liquid; and
   c. a pressure transducer communicating with the interior of said container for measuring the pressure increase caused by the molecular expansion imparted to the liquid by the pulsed energy of said radiant source.

2. A light energy calorimeter as defined in claim 1 which further comprises a dye mixed with said liquid to increase the light absorption thereof.

3. A light energy calorimeter as defined in claim 1 wherein means are provided for imparting a known amount of energy to said liquid and including a heating element disposed in said container and means for supplying thereto a pulse of known electric energy so as to calibrate said calorimeter.

4. A light calorimeter as defined in claim 1 wherein said vessel is coated at least partially with a light reflecting material, thereby to minimize reradiation of the light energy absorbed by said liquid.

* * * * *